Oct. 30, 1962   R. L. SHALLENBERG   3,061,030
MEANS FOR REGULATING MULTIPLE DRIVE UNITS
Filed May 31, 1960
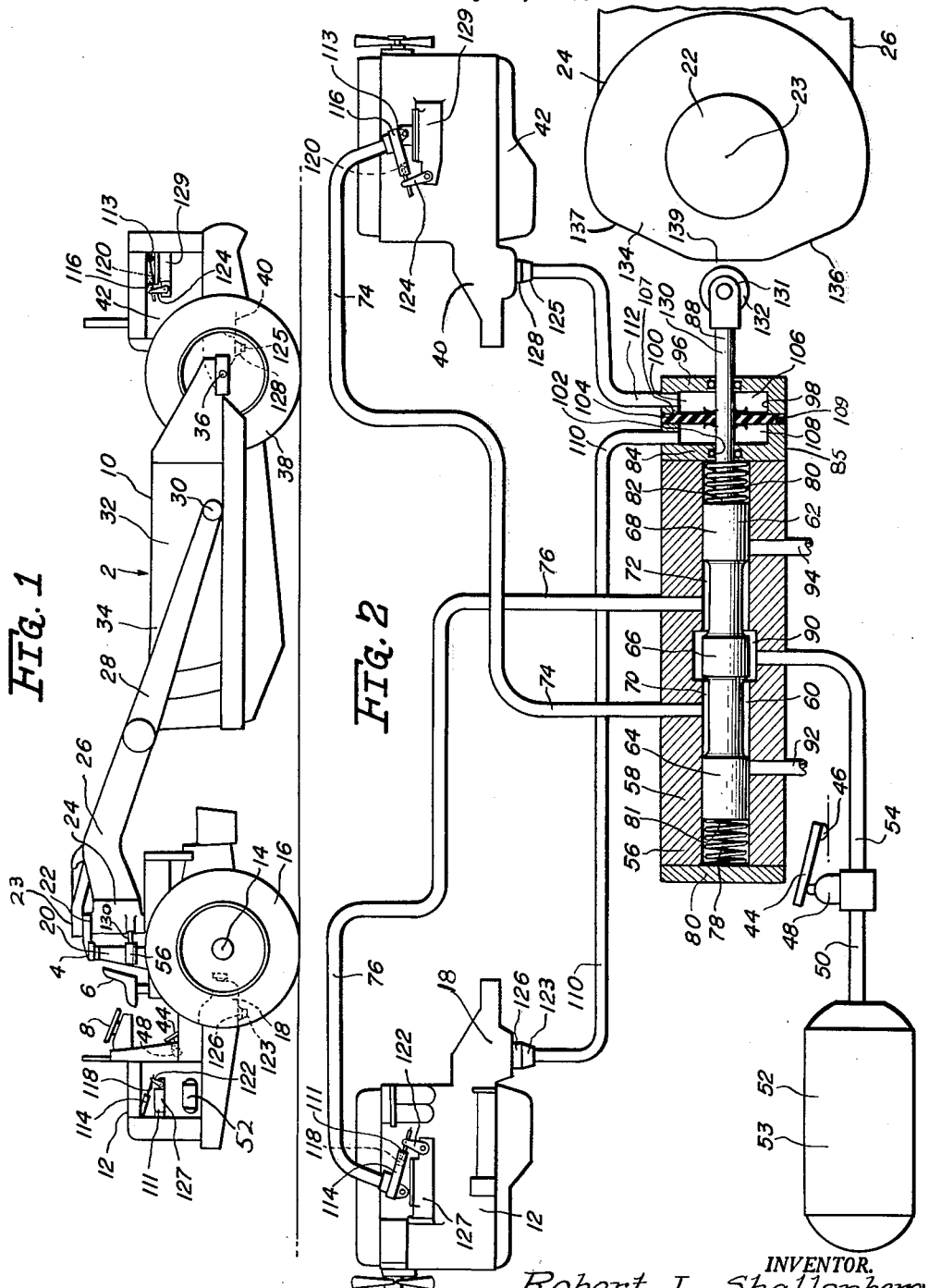
INVENTOR.
Robert L. Shallenberg
Atty.

United States Patent Office 3,061,030
Patented Oct. 30, 1962

3,061,030
MEANS FOR REGULATING MULTIPLE DRIVE UNITS
Robert L. Shallenberg, Wheaton, Ill., assignor to International Harvester Company, Chicago, Ill., a corporation of New Jersey
Filed May 31, 1960, Ser. No. 32,805
11 Claims. (Cl. 180—12)

This application refers to control means for drive units and in particular means for regulating or synchronizing the speed of multiple drive units.

In vehicles having one engine to drive its front axle and another engine to drive its rear axle, it is desirable to regulate the speed of one axle with respect to the speed of the other axle in performing the various operational activities of the vehicle.

It is therefore a general object of this invention to provide control means for drive units.

It is another object of this invention to provide means for regulating or synchronizing the speed of multiple drive units.

It is another object of this invention to provide means for regulating the speed of multiple engines in response to external loading on the ground engaging members employed on a vehicle.

It is another object of this invention to provide means for regulating the speed of one engine driving one axle of a vehicle with respect to the speed of a second engine driving the other axle of the same vehicle.

Still another object of this invention is to govern the speed of an engine driving one axle of the vehicle with respect to the speed of a second engine driving another axle of the vehicle while the vehicle is performing a turning movement.

Still another object is to reduce the speed of one vehicle axle relative to the speed of a second vehicle axle in proportion to the amount of a vehicular turning.

A still further object of this invention is to provide control means for controlling the speed of an engine operating a front vehicle with the speed of an engine driving a rear vehicle which is pivotally connected to the front vehicle in order to synchronize the speed of the respective vehicular axles.

It is still a further object to provide a control means for regulating multiple engines on a vehicle in order to effect the relative speeds of complementary multiple ground engaging members of the vehicle.

It is still another object of this invention to provide drive unit synchronizing speed responsive means for preventing the speed of one axle on a vehicle from exceeding the speed of another axle mounted on the vehicle when the speed of the one axle is affected by a change in ground traction.

These and other objects of the invention will become more apparent from the foregoing drawings and specifications wherein:

FIGURE 1 is a side elevational view of a vehicle having a pair of engines for driving the front and rear axles thereof; and FIGURE 2 is a diagrammatic view of the engine speed control system including the engine speed control and its connection with each of the engines and cam means effected by vehicular turning.

Now with particular reference to the drawings there is shown an earth working vehicle or mobile scraper unit 2 having a front section or cab 4 carrying the operator's seat 6 and operator controls 8 and a rear section or unit or scraper bowl 10 in tandem relation to front section 4. The cab section or unit 4 has a front power source of engine 12 for driving a drive train including axle 14 and ground engaging means or wheels 16 (right side of tractor 2 not being shown) through a conventional torque converter 18. On the front vehicle portion or unit 4 and behind the seat 6 is the spindle yoke assembly 20 carrying spindle or pivot member 22 to which is rotatably connected the member or tongue 24 of gooseneck 26 which is coupled to a reach member 28 connected at 30 to scraper bowl 32 of rear vehicle portion or unit 10. The scraper bowl 32 has a front part 34 pivoted at its rear about axle 36 which drives wheels 38 by way of conventional torque converter 40 and engine or power source 42.

The structure of the load scraper vehicle 2 having the self-powered tractive unit 4, 10 described above is conventional and serves to permit engines 12 and 42 to drive their respective sections 4 and 10 which for turning purposes pivot with respect to each other about pivot axis 23 for permitting cab 4 with its ground engaging members 16 to become transverse to scraper portion 10 and its ground engaging members 38.

Below and forward of the operator's seat 6 is an engine speed control member or accelerator pedal 44 which increases the speed of both engines proportionately to the extent that the operator's foot depresses such throttle pedal 44 downwardly about pivot 46 and contacts a pressure regulator valve 48 on the cab 4 which valve 48 has a conduit 50 in communication with a source 52 of fluid 53 under pressure which may take any conventional form such as an air compressor or any gas or liquid under pressure developed by a pump. The fluid pressure control valve 48 has a fluid line 54 leading from it for conduction of the fluid 53 under pressure to a coordinating means or an engine control or pressure balancing valve assembly 56 mounted on the yoke assembly 20.

The balancing assembly or unit 56 comprises a housing 58 having a bore 60 carrying a valve stem 62 having three axially spaced lands 64, 66 and 68 defining chambers 70 and 72 therebetween communicating with the fluid lines 74 and 76 respectively. The valve stem 62 is centered within the bore 60, as shown in FIGURE 2, by means of counter-balancing compression springs 78 and 80 at opposite ends of the bore 60, the spring 78 being between one end of the bore formed by the housing 56 and the outside face 81 of the land 64 and the spring 80 being between the outside face 82 of the land 68 and a wall 84 of a hollow member 85 abutting and connected to the housing 58, said spring 80 being sleeved over an extension 88 of the valve 62 projecting outwardly from land 68 and through the hollow member 85.

In its normal or equilibrium position, as shown in FIGURE 2, the valve stem 62 has its land 66 centrally aligned with annulus 90 formed approximately midway in bore 60 permitting communiaction of line 54 with lines 74 and 76 and lands 64 and 68 blocking off communication of vents 92, 94 with the bore 60 and the lines 54, 74, and 76. The wall 84 with wall 96 and cylindrical wall 98 of housing 85 form a fluid receiving chamber 100 and the extension 88 passes through the bore 102 in wall 84 and chamber 100 and has journalled on it a flexible diaphragm unit 104 dividing said chamber 100 into subchambers 106 and 108, the diaphragm or flexible member 104 being centrally held in chamber 100 within bores 107, 109 in wall 98 and being substantially parallel to walls 84 and 96, the subchamber 108 having fluid line 110 communicating therewith and subchamber 106 having fluid conduit 112 communicating therewith.

Fluid lines 74 and 76 communicate respectively with throttle control means or engine speed reducers 111, 113 in the form of fluid control cylinders 114, 116 operating pistons 118, 120 to move fuel injection pump control levers 122, 124 of engine injection pumps 127, 129 and effect the amount of fuel supply to engines 12, 42. Lines 110 and 112 are in fluid communication with ground speed responsive means or drive train speed sensors 123 and 125 including pressure fluid sources 126 and 128 respectively which may be variably pressurized by any conventional means such as gear pumps driven by the output shafts of the torque converters 18 and 40. Under this construction, variation in the speed of the wheels 16, 38 results in variation in fluid pressures developed in the output speed sensing means or speed sensors 123, 125.

The extension 88 of the valve 62 has a portion 130 extending through wall 96 beyond the housing 85 and has at its outer end 131 a cam actuated means or roller 132 for engagement with a cam means 134 mounted on the tongue 24 and having cam surfaces 136, 137 and clearance flat 139 formed on the trailing unit tongue 24.

The engine speed control means or balancing valve means 56 operates as follows: When the vehicle 2 is driving in substantially a straight path and neither front nor rear sets of wheels 16, 38 are slipping, the same amount of fuel is delivered to both engines 12, 42 in view of pedal 44 and pressure regulator 48 which deliver the same fluid pressure through each line 74 and 76 to throttle cylinders 114, 116 as the plunger 62 has its middle land 66 located centrally within annulus 90 as shown in FIGURE 2 and the speed sensors or output speed responsive means 123, 125 maintain the same equal fluid pressures in both chambers 106, 108. Through the amount of fluid pressure in lines 74, 76 increases and consequently the amount of fluid pressure in chambers 106, 108 with increase acceleration by movement of the pedal 44, the valve stem 62 will still maintain this balanced or neutral position. However, if the rear wheels 38 of the vehicle should slip and therefore spin faster than the front wheels 16, this would result in an increase in the speed of the torque converter output shaft of torque converter 40 actuating the sensor 125 which would cause an increase in pressure in fluid chamber 106 relative to the pressure in fluid chamber 108 thus causing diaphragm 104 and the piston stem 62 to move to the left as viewed in FIGURE 2 blocking line 54 from line 74 and allowing the fluid or air 74 to vent through line 92 to the atmosphere or other lower pressure source and at the same time land 66 would be blocking line 74 from fluid pressure line 54 allowing piston 116 to move to the right and decrease the speed control setting of engine 42 with consequent reduction in the speed of the wheels 38. Similarly if the front wheel 16 should slip as the vehicle traverses along the ground, the output shaft of the torque converter 18 would speed up and cause an increase in pressure in chamber 108 to move the plunger 62 to the right opening line 76 to vent passage 94 leading to the atmosphere and at the same time land 66 would block line 76 from fluid line 54 with resultant drop in the speed of engine 12 and wheels 16.

If the operator wishes to turn his vehicle to the right or left the speed of the rear wheel would be reduced with respect to the speed of the front wheel as follows:

As the driver turns steering wheel 8 to the left as viewed from the top of vehicle 2 shown in FIGURE 1, the cab 4 would pivot about axis 23 carrying with it the cam roller 132 in a counterclockwise direction causing the roller 132 to engage the cam surface 136 moving the plunger 62 of the valve means or speed proportionalizing means 56 to the left as viewed in FIGURE 2 resulting in reduction in speed of rear engine 42 and wheel 38, the greater the extent of the counterclockwise movement of the cam roller 132 the greater the movement of the valve member to the left and the greater the reduction in the speed of engine 42 and associated wheel 38. The same result occurs when the steering wheel 8 is turned to the right. Thus it is seen that as turning of the vehicle is increased, reduction of speed of the rear wheel 38 is also increased, so that a full 90° turn will result in the rear engine being at idle without any drive being imparted to the rear wheel 38.

To allow for free action of the piston stem 88 to control slippage overspeed of one axle relative to the other in straight or nearly straight operation, and to effect the slowing down of the rear axle relative to the front axle when making small turns of say 25° or less, the cam 134 is designed to clear roller 132 until the turning angle of the cam 134 exceeds a value of approximately 25° in the clockwise or counterclockwise direction for right and left hand vehicular turns because the cam 134 presents the flat surface 139 opposed to and removed from the roller 132.

While the device has been shown and the structure described in detail, it is obvious that this invention is not to be considered as being limited to the exact form disclosed, and that changes in detail in construction may be made therein within the scope of what is claimed, without departing from the spirit of this invention.

What is claimed is:

1. A vehicle comprising front and rear portions articulately interconnected on substantially a vertical axis for turning movements, cam means carried by one of the portions, valve means carried by the other portion in controlled relation by the cam means and having a neutral position, an independent wheel driving power source carried by each portion, each power source having throttle control means operatively associated with the valve means, a source of pressurized fluid communicating by way of the valve means with each throttle control means in the neutral position of said valve means, and the valve means having a discharge passage and having a cam operated member having engagement with the cam means in another position of the valve means blocking communication between the throttle control means on the other portion and the source of fluid and opening the throttle control means on the other portion to the discharge passage to reduce fuel and throttle down the power source on the other portion to facilitate turning of the vehicle.

2. A vehicle comprising a plurality of portions drivingly interconnected with one another and each of said portions having ground engaging means and an independent driving power source thereon including throttle control means regulating the amount of speed of the ground engaging means, pressure sensing means responsive to the speed of the ground engaging means, valve means carried by the vehicle in controlled relation by the sensing means and including first and second chambers communicating respectively with each pressure sensing means and having a discharge passage, a source of pressurized fluid communicating by way of the valve means with each of the throttle control means, each pressure sensing means expanding the respective chamber positioning the valve means for terminating communication of one throttle control means with the source of pressurized fluid and opening the throttle control means to the discharge passage to throttle down one of the power sources upon slippage of its respective ground engaging means.

3. A vehicle comprising front and rear portions articulately interconnected on substantially a vertical axis for turning movements, cam means carried by one of the portions and valve means carried by the other portion, a drive train on each portion and a drive train power source carried by each portion, each power source having throttle control means, and sensing means responsive to the speed of the drive train operatively associated with the valve means, said valve means being conditionable by said cam means and said sensing means responsive to the speed of the drive train to preselectively control the throttle means of one of said power sources to throttle down said one of said power sources to facilitate turning and to synchronize the speed of one drive train to the speed of the other drive train wherein said vehicle having a source of pressurized fluid communicating by way of the valve means with each throttle control means in the neutral position of said valve means, and the valve means having a discharge passage and having a cam operated member having engagement with the cam means in another position of the valve means blocking communication between the throttle control means on the other portion and the fluid source and opening the throttle control means on the other portion to the discharge passage, said valve means including first and second chambers communicating respectively with each sensing means, each sensing means expanding the respective chamber positioning the valve means for terminating communication of one throttle control means with the source of pressurized fluid and opening the throttle control means to the discharge passage.

4. The invention according to claim 2 and said throttling means including a piston reciprocal within a cylinder communicating with the valve means and the fluid source in the neutral position of the valve means and operatively connected to an associated engine fuel control means.

5. The combination of a pair of self-propelled vehicular sections, throttle means for each section, output speed responsive means on each section, and coordinating means operative by said responsive means and operative of the throttle means for advancing and retracting the same in response to the dictates of said responsive means, and said coordinating means being provided with conduit means communicating with each output speed responsive means and being provided with passage means communicating with each throttle means, a source of fluid pressure being in fluid communication with said coordinating means associated with the throttling means and said coordinating means operable to selectively communicate at least one of the throttle means with the source of fluid pressure and means on the vehicle operatively associated with said source and operable to increase the fluid pressure for increased activity of the throttle means.

6. The combination of a pair of self-powered units interconnected for conjunctive operation, each of such units carrying an engine means including pressure responsive throttle control means and engine output speed sensing means, a source of fluid under pressure and being provided with conduit means normally communicable with each throttle control means, pressure responsive valve means on the vehicle being operatively connected with the conduit means and being interposed in fluid obstructing relation between each of the throttle control means and the source of fluid, each of said sensing means being provided with passage means in fluid communication with the valve means and conducting the valve means to preselectively throttle down the engine means of one of the units for proportionalizing the output speed of each unit.

7. The combination of a pair of self-powered units interconnected for conjunctive operation, each of such units carrying an engine means including pressure responsive throttle control means and engine output speed sensing means, a source of fluid under pressure on the vehicle and normally communicable with each throttle means, pressure responsive valve means on the vehicle being interposed in fluid obstructing relation between each of the throttle control means and the source of fluid, said sensing means conditioning the valve means to preselectively throttle down the engine means of one of the units for proportionalizing the output speed of each unit, and a torque converter coupled to said engine means, the sensing means of each of the units being responsive to changes in output speed of the torque converter and having a source of fluid variably pressurized by the changes in speed output and in communication with the valve means.

8. The combination of a pair of self-powered units interconnected for conjunctive operation, each of such units carrying an engine means including pressure responsive throttle control means and engine output speed sensing means, a source of fluid under pressure on the vehicle and normally communicable with each throttle means, pressure responsive valve means on the vehicle being interposed in fluid obstructing relation between each of the throttle control means and the source of fluid, said sensing means conditioning the valve means to preselectively throttle down the engine means of one of the units for proportionalizing the output speed of each unit, the valves means including a pair of chambers, a first source of fluid pressure communicable between one sensing means and one chamber and a second source of fluid pressure communicable between the other sensing means and the other chamber, a valve operator operably associated with each throttle control means, and flexible means separating the chambers and operatively connected to the valve operator for movement of the latter responsive to pressure fluctuation in one of the chambers.

9. The combination of a pair of self-powered units interconnected for conjunctive operation, each of such units carrying an engine means including pressure responsive throttle control means and engine output speed sensing means, a source of fluid under pressure on the vehicle and normally communicable with each throttle means, pressure responsive valve means on the vehicle being interposed in fluid obstructing relation between each of the throttle control means and the source of fluid, said sensing means conditioning the valve means to preselectively throttle down the engine means of one of the units for proportionalizing the output speed of each unit, the valve means including a valve cylinder having an annulus, a valve member reciprocal within the cylinder and having three lands, and porting means including a first conduit means between the first and second land and communicating with one throttle control means, and second conduit means between the second and third lands and communicating with the other throttle control means, and a third conduit means communicative between the annulus and the source of fluid pressure.

10. The combination of a pair of self-powered units interconnected for conjunctive operation, each of such units carrying an engine means including pressure responsive throttle control means having a conduit and engine output speed sensing means having a passage, a source of fluid under pressure operatively connected with each conduit for being normally communicable with each throttle control means, pressure responsive means on the vehicle being operatively connected with each conduit and being interposed in fluid obstructing relation between each of the throttle control means and the source of fluid, each of said sensing means having its passage in communication with the pressure responsive means and conducting the pressure responsive means to preselectively throttle down the engine means of one of the units for proportionalizing the output speed of each unit.

11. The combination of a pair of self-powered units interconnected for conjunctive operation, each of such units carrying an engine means including pressure responsive throttle control means having a conduit and engine output speed sensing means having a passage, a source of fluid under pressure operatively connected with each conduit for being normally communicable with each throttle control means, pressure responsive means on the vehicle being operatively connected with each conduit and being interposed in fluid obstructing relation between each of the throttle control means and the source of fluid, each of said sensing means having its passage in communication with the pressure responsive means and conducting the pressure responsive means to preselectively throttle down the engine means of one of the units for proportionalizing the output speed of each unit, said pressure responsive means comprising a valve arrangement including a valve member, and a flexible wall operatively associated with the member and separating each passage from one another.

References Cited in the file of this patent

UNITED STATES PATENTS

| | | |
|---|---|---|
| 1,842,057 | Young | Jan. 19, 1932 |
| 2,103,274 | Sanford | Dec. 28, 1937 |
| 2,406,944 | Choate et al. | Sept. 3, 1946 |
| 2,419,929 | Wilcox | Apr. 29, 1947 |
| 2,545,458 | Ginn | Mar. 20, 1951 |
| 2,600,897 | Mathias | June 17, 1952 |
| 2,630,871 | Simpkins | Mar. 10, 1953 |